United States Patent
Tiede et al.

(10) Patent No.: US 6,411,868 B2
(45) Date of Patent: Jun. 25, 2002

(54) METHOD FOR IDENTIFYING A STATIONARY STATE OF A VEHICLE

(75) Inventors: Lutz Tiede, Lappersdorf; Jürgen Leimbach, Regensburg, both of (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/783,824

(22) Filed: Feb. 14, 2001

(30) Foreign Application Priority Data

Mar. 3, 2000 (DE) .......................... 100 10 607

(51) Int. Cl.[7] .............................................. G06F 19/00
(52) U.S. Cl. ............................ 701/1; 701/217; 701/221
(58) Field of Search ........................... 701/1, 213, 217, 701/220, 221

(56) References Cited

U.S. PATENT DOCUMENTS

| | | | | |
|---|---|---|---|---|
| 5,117,559 A | * | 6/1992 | Sindlinger et al. | 33/324 |
| 5,345,382 A | * | 9/1994 | Kao | 33/356 |
| 5,374,933 A | * | 12/1994 | Kao | 342/357.13 |
| 5,424,953 A | * | 6/1995 | Masumoto et al. | 340/988 |
| 5,795,988 A | * | 8/1998 | Lo et al. | 73/1.77 |
| 5,926,511 A | * | 7/1999 | Fleischmann | 375/229 |
| 6,075,482 A | * | 6/2000 | Fukushima | 342/359 |
| 6,147,626 A | * | 11/2000 | Sakakibara | 33/356 |

FOREIGN PATENT DOCUMENTS

| | | | | |
|---|---|---|---|---|
| DE | 33 02 184 A1 | 1/1983 | | G07C/5/04 |
| DE | 41 18 867 C2 | 6/1991 | | B60G/23/00 |
| DE | 694 12 496 T2 | 9/1994 | | G07B/15/02 |
| DE | 198 38 885 A1 | 8/1998 | | B60T/8/00 |
| DE | 199 37 689 A1 | 8/1999 | | G01P/21/00 |

\* cited by examiner

*Primary Examiner*—Tan Nguyen
(74) *Attorney, Agent, or Firm*—David M. Thimmig; Mayer, Brown, Rowe & Maw

(57) ABSTRACT

A method for distinguishing between a movement state and a rest state of a motor vehicle, in which the output signal of a sensor arranged in the vehicle is evaluated. The invention provides for the noise of the sensor signal to be evaluated in order to distinguish between the movement state and the rest state of the vehicle.

19 Claims, 2 Drawing Sheets

METHOD FOR IDENTIFYING A STATIONARY STATE OF A VEHICLE

BACKGROUND OF THE INVENTION

The invention relates to a method for distinguishing between a movement state and a rest state of a motor vehicle by evaluating the output signal of a sensor arranged in the vehicle.

Particularly in connection with navigation systems of motor vehicles, a plurality of sensors are used for determining the spatial position of a vehicle. The exact position of the vehicle is usually determined from a combination of satellite position-finding and dead reckoning position-finding.

For dead reckoning position-finding, use is made of a direction sensor, which is usually designed as a rate-of-rotation sensor, and a distance measuring device. The distance measuring device may be, for example, the tachometer which is present in any case in the vehicle. On account of the greater accuracy, however, the measurement signals of an anti-lock braking system are also often used for distance measurement. However, it is precisely in the case of the latter system that signals are suppressed below a specific limiting speed of typically about 3 km/h. This means that the vehicle standstill cannot be reliably identified using the signals of the distance measuring device.

Identification of the vehicle standstill is of particular importance, however, in navigation systems, since the various position-finding signals are calibrated in this state. Moreover, interference signals during the vehicle standstill, such as e.g., caused by the slamming of the vehicle door, leads to erroneous calibration. It is desirable, therefore, to carry out calibration of the sensors only when the motor vehicle is in a rest state, i.e., the vehicle is both at standstill and, preferably, no other vibrations occur.

SUMMARY OF THE INVENTION

The object of the invention, therefore, is to specify a method which makes it possible to reliably distinguish between a movement state and a rest state of a motor vehicle, this distinguishing being possible, in particular, even in the absence of a signal from a distance measuring device.

In the case of a method of the generic type, the object is achieved by virtue of the fact that the noise of the sensor signal is evaluated in order to distinguish between the movement state and the rest state. It has been found that the noise of a sensor in the motor vehicle distinctly depends on whether the motor vehicle is in a movement state or a rest state. Proceeding from this insight, therefore, the sensor noise is preferably evaluated statistically. This makes it possible to reliably distinguish between a movement state and a rest state. In particular, the rest state in this case does not just include the vehicle standstill, rather external vibrations of the vehicle as are produced e.g. ,by the slamming of a vehicle door can also be reliably detected using the statistically evaluated noise. Depending on the statistically evaluated sensor noise, a comparator outputs a yes/no signal with regard to the movement state of the motor vehicle.

The statistical evaluation of the sensor noise is effected, in particular, in such a way that firstly the mean is calculated from the signals $X_i$ of the sensor in accordance with $$m_x^{(1)} = \bar{x} = \frac{1}{N}\sum_{i=1}^{N} x_i$$

and the mean is subsequently squared. In addition, the root mean square is calculated from the sensor signals in accordance with $$m_x^{(1)} = \bar{x} = \frac{1}{N}\sum_{i=1}^{N} x_i$$

Finally, the variance is calculated from the squared mean and the root mean square in accordance with $$\sigma_x^2 = (m_x^{(2)}) - (m_x^{(1)})^2.$$

The variance thus formed is fed to a comparator which, by comparison with a stipulated value, takes a yes/no decision with regard to the movement state.

The sensor signal may, in particular, be the signal of a rate-of-rotation sensor, as is used in navigation systems. In this case, the identification of the rest state of the motor vehicle is performed entirely without any consideration of the signals from a distance measuring device. In particular, the method can, therefore, also be used when, in the navigation system, instead of a distance measuring device, the signals from an acceleration sensor are evaluated for the distance determination.

The method is preferably used in a navigation system having a plurality of sensors for position determination. These sensors are, in particular, a direction sensor and a distance and/or acceleration sensor. A distinctly improved accuracy can be achieved by calibrating these sensors in the rest state of the vehicle whilst taking account of the position signals of a satellite navigation system. The sensors of the navigation system are calibrated in a manner known per se. In order to achieve high accuracy in the determination of the position of the vehicle, dead reckoning navigation and satellite navigation are additionally accompanied by so-called map matching, in which a comparison of the vehicle position determined by dead reckoning and/or satellite navigation with road map data is carried out in order to determine the vehicle position.

However, the application of the method is not restricted to navigation systems. As a result of reliably distinguishing between a movement state and a rest state of the vehicle, the method can also be utilized for the purpose of detecting vehicle vibrations in the case of a vehicle which is not being operated. In particular, the method can, therefore, be used in an alarm system which, with the vehicle parked, detects vehicle vibrations and, if appropriate, triggers an alarm. The alarm triggering threshold can be set by corresponding setting of the comparator, so that slight vehicle vibrations, as occur e.g. as a result of trucks traveling past, do not lead to alarm triggering.

A navigation system, according to the invention, for motor vehicles having sensors for determining a vehicle position is characterized in that the navigation system contains means for evaluating the noise of a sensor signal and for carrying out standstill identification using the evaluated sensor noise signal. In particular, means for calibrating the sensors are furthermore present in the navigation system. The corresponding means may be embodied either as software or else at least partly as hardware.

BRIEF DESCRIPTION OF THE DRAWINGS

The invention is explained in more detail below with reference to an exemplary embodiment and the drawing, in which.

DETAILED DESCRIPTION OF THE PREFERRED EMBODIMENT

Figure 1:
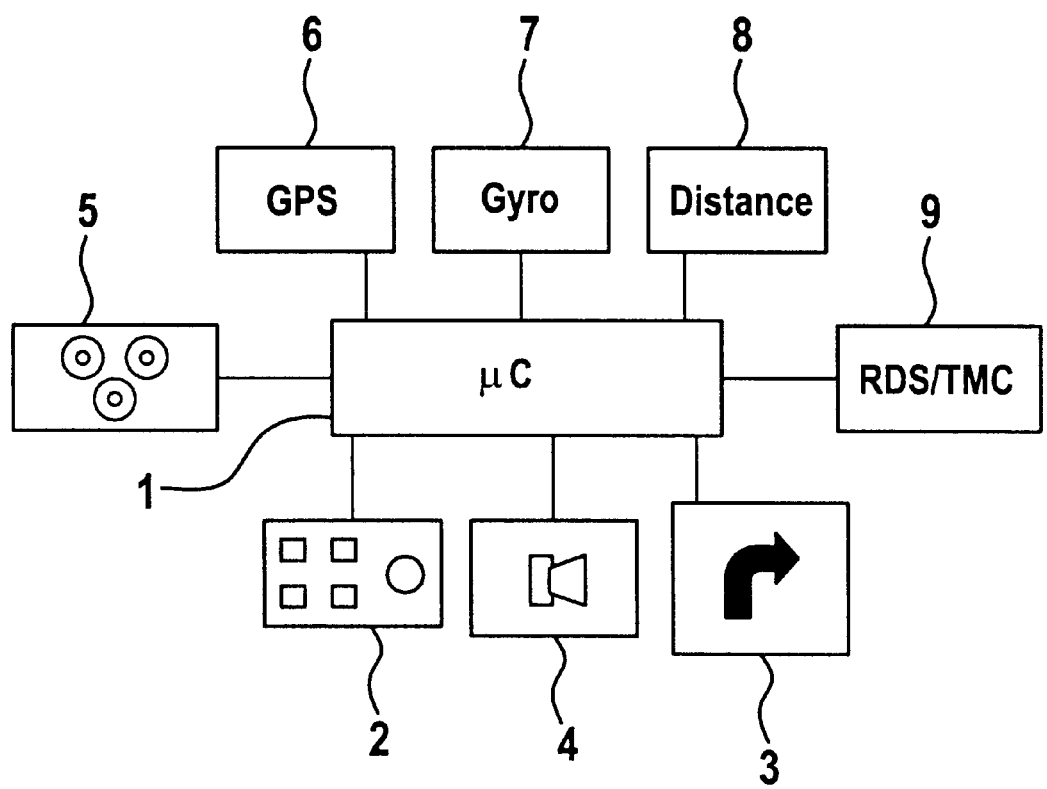
FIG. 1 shows the components of a navigation system.

FIG. 1 shows the essential components of a motor vehicle navigation system. The central component is the control unit 1, which contains a microprocessor with the associated memory elements. An input unit 2, via which, for example, a destination can be input or selected from a list, is connected to the control unit 1. Furthermore, an optical output unit 3 and an acoustic output unit 4, via which navigation advice is output, are connected to the control unit 1.

The digital road map data required for route calculation are stored on a storage medium having a high storage capacity, such as e.g., a CD-ROM or a DVD, and are read out by means of the reading device 5, which is likewise connected to the control unit 1. For position determination, the navigation system has a receiving and evaluating device 6 for satellite signals, whereby satellite navigation can be carried out. Furthermore the navigation system has a direction sensor 7, which is designed as a rate-of-rotation sensor, and also a distance measuring device 8.

With the signals from the direction sensor 7 and the distance measuring device 8, dead reckoning navigation is carried out with the aid of a suitable program in the control device 1. Furthermore, the control device 1 is connected to a radio receiver 9, so that up-to-date traffic messages can be taken into account during the route calculation. The sensors for direction identification and distance measurement are calibrated, with the vehicle at a standstill, with the position data of the satellite navigation in a manner known per se. This achieves greater correspondence of the vehicle position detected by satellite navigation and dead reckoning position-finding.

Figure 2:
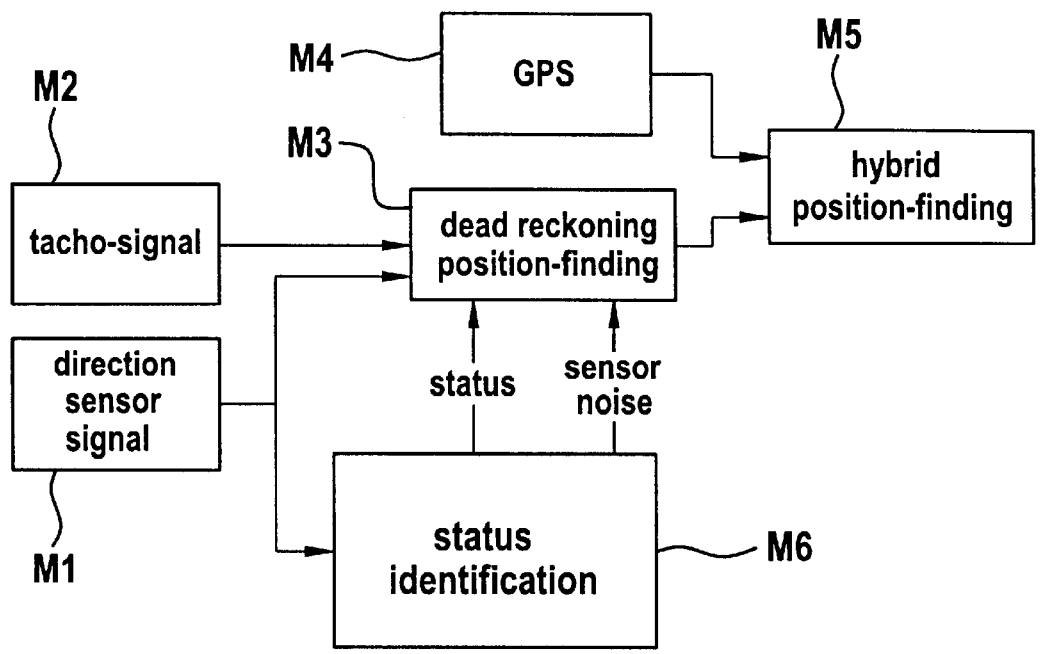
FIG. 2 shows the essential modules of a position-finding system.

The essential modules for position-finding and their interaction are illustrated in greater detail in FIG. 2. The signal from a direction sensor is made available in the module M1, while the module M2 makes a tacho-signal available. Using the tacho-signal and the direction sensor signal, dead reckoning position-finding is carried out in the module M3. Furthermore, satellite position-finding is carried out in the GPS module M4. The results of the dead reckoning position-finding in the module M3 and the satellite position-finding in the GPS module M4 are finally combined with one another in a manner known per se in the module M5 in order to determine the most likely vehicle position. The modules M3 and M5 are realized completely as software in the control unit of the navigation system, while the GPS module M4 has both software and hardware components.

Furthermore, a module M6 is present, which serves for identifying a rest state of the vehicle. As its input signal, the module M6 receives the output signal of the direction sensor. Output signals of the module M6 include both the sensor noise of the direction sensor and a signal with regard to a rest or movement state of the vehicle. The two output signals of the module M6 are fed to the module M3 for dead reckoning position-finding and serve for calibrating the signals for dead reckoning position-finding.

Figure 3:
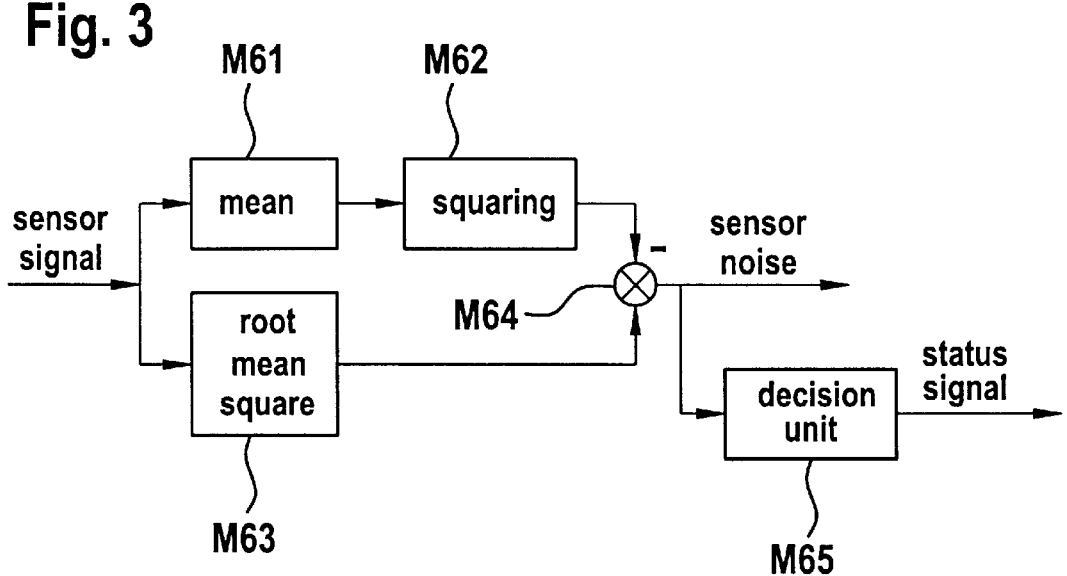
FIG. 3 shows the modules of an arrangement for identifying the rest state.

The individual components of the module M6 for identifying the rest state are illustrated in greater detail in FIG. 3.

In the module M61, firstly the mean is formed from the individual sensor signals $x_i$:

$$m_x^{(1)} = \bar{x} = \frac{1}{N}\sum_{i=1}^{N} x_i$$

In the module M62, the mean thus formed is subsequently squared. In parallel with this, in the module M63, a root mean square is formed from the sensor signals:

$$m_x^{(2)} = E(x^2) = \frac{1}{N}\sum_{i=1}^{N} x_i^2$$

From the squared mean, which is the output signal of the module M62, and the root mean square, which is the output signal of the module M63, the variance is calculated in the module M64:

$$\sigma_x^2 = (m_x^{(2)}) - (m_x^{(1)})^2$$

This variance is forwarded as sensor noise directly to the module M3 for dead reckoning position-finding. In parallel with this, the variance is fed to a module M65, in which, using the calculated variance and a stipulated value, a decision is taken as to whether the vehicle is in the rest state or in a movement state. The output signal of the module M65, which is designed as a comparator is thus a yes/no signal. This yes/no signal, which may assume e.g., the values 0 or 1, is likewise fed to the module M3 for dead reckoning position-finding. If the module M65 can unambiguously ascertain from the variance of the sensor signal that the vehicle is in the rest state then the required calibration of the sensor signals can be carried out in a manner known per se.

The invention has been explained using a special navigation system, but it is not restricted either to this special navigation system or to application in navigation systems.

What is claimed is:

1. A method for distinguishing between a movement state and a rest state of a motor vehicle comprising the steps of evaluating the output signal of a sensor arranged in the vehicle, including evaluating the noise of the sensor signal statistically to distinguish between the movement state and the rest state wherein, for the statistical evaluation of the sensor noise, the squared mean and the root mean square of the sensor signal are calculated and the variance is formed.

2. The method in accordance with claim 1, wherein the sensor signal is that of a rate-of-rotation sensor.

3. The method in accordance with claim 1, wherein the distinction between a movement state and a rest state of the vehicle is utilized for the purpose of detecting vehicle vibrations in the case of a vehicle which is not being operated.

4. The method in accordance with claim 3, wherein an alarm is triggered when vehicle vibrations are detected.

5. A method for distinguishing between a movement state and a rest state of a motor vehicle having a navigation system, the navigation system having a plurality of sensors for position determination comprising the steps of:

evaluating the output signal of one of the sensors wherein the noise of the sensor signal is evaluated to distinguish between the movement state and the rest state wherein, for the evaluation of the sensor noise, the squared mean and the root mean square of the sensor signal are calculated and the variance is formed.

6. The method in accordance with claim 5, wherein the sensors are calibrated in a rest state of the vehicle.

7. The method in accordance with claim 5, wherein dead reckoning navigation is carried out to determine the position of the vehicle.

8. The method in accordance with claim 7, wherein satellite navigation is carried out to determine the position of the vehicle.

9. The method in accordance with claim 8, wherein a comparison between the vehicle position determined by dead reckoning and satellite navigation and road map data is carried out to determine the position of the vehicle.

10. The method in accordance with claim 8, wherein a comparison between the vehicle position determined by dead reckoning or satellite navigation and road map data is carried out to determine the position of the vehicle.

11. The method in accordance with claim 7, wherein a comparison between the vehicle position determined by dead reckoning and road map data is carried out to determine the position of the vehicle.

12. The method in accordance with claim 5, wherein satellite navigation is carried out to determine the position of the vehicle.

13. The method in accordance with claim 12, wherein a comparison between the vehicle position determined by satellite navigation and road map data is carried out to determine the position of the vehicle.

14. The method in accordance with claim 5, wherein the distinction between a movement state and a rest state of the vehicle is utilized for the purpose of detecting vehicle vibrations in the case of a vehicle which is not being operated.

15. The method in accordance with claim 14, wherein an alarm is triggered when vehicle vibrations are detected.

16. A navigation system for motor vehicles having sensors for determining a vehicle position, wherein the navigation system contains means for evaluating the noise of at least one sensor signal and for carrying out standstill identification using at least one evaluated sensor noise signal.

17. The navigation system in accordance with claim 16 further comprising means for calibrating the sensors.

18. The navigation system in accordance with claim 16 further comprising an input unit, an output unit and a reading device for digital road map data, each of which is connected to a central processing unit.

19. The navigation system in accordance with claim 17 further comprising an input unit, an output unit and a reading device for digital road map data, each of which is connected to a central processing unit.

* * * * *